United States Patent Office 3,636,145
Patented Jan. 18, 1972

3,636,145
PREPARATION OF TRIALKENYL PHOSPHITES
Arthur D. F. Toy, Stamford, Conn., assignor to Stauffer Chemical Company, New York, N.Y.
No Drawing. Filed Mar. 24, 1969, Ser. No. 809,990
Int. Cl. C07f 9/08
U.S. Cl. 260—982          3 Claims

ABSTRACT OF THE DISCLOSURE

A procedure for preparing a trialkenyl phosphite is disclosed, said procedure comprising reacting trimethyl phosphite and an alkenol in the presence of a non-azeotropic solvent. The use of a solvent which does not form an azeotrope with methyl alcohol, the by-product of the reaction of an alkenol with trimethyl phosphite, has led to improved product yield and purity as well as an extremely rapid reaction rate.

BACKGROUND OF THE INVENTION

Field of the invention

The present invention relates to a new and improved procedure for preparing a trialkenyl phosphite by a transesterification reaction involving trimethyl phosphite and an alkenol. The reaction is suitably conducted in the presence of a non-azeotropic solvent and an alkaline catalyst. The products obtained by the present process and especially triallyl phosphite are useful as intermediates in the preparation of compounds employed in flameproofing fabrics.

Description of the prior art

In early procedures for preparing trialkenyl phosphites, alkenols were reacted with triaryl phosphites but such procedures were unsuitable for large scale production not only because low yields of the desired product were obtained but in addition, the desired product was obtained in admixture with other substances. Thus, when allyl alcohol and triphenyl phosphite were reacted, triallyl phosphite was obtained in admixture with diallyl phenyl phosphite and separation of the desired triallyl phosphite from the diallyl phenyl phosphite was difficult.

In an attempt to avoid the shortcomings of the aforesaid prior art procedures, U.S. Pat. 2,852,551 disclosed a procedure for the preparation of a trialkenyl phosphite. However, in this process, a large excess of the alkenol was required, that is, at least 4.5 mols of the alkenol and preferably, 6 mols of the alcohol. If less than 6 mols of the alcohol were employed, reduced yields were obtained and the reaction slurry became so thick that is was difficult to stir the mixture. In the only actual example described in this patent, a yield of 80% of the triallyl phosphite was obtained when 6 mols of the allyl alcohol were mixed with 1 mol of triphenyl phosphite.

In another process disclosed by E. L. Gefter, "Organo Phosphorus Monomers and Polymers," Associated Technical Services, Incorporated, Glenridge, U.S.A. 1962, page 23, triallyl phosphite was obtained by reacting phosphorus trichloride with 3 mols of allyl alcohol in the presence of a tertiary amine as the hydrogen chloride acceptor. However, this process too was unsuitable for large scale production since only a 71.6% yield was reported.

In a further procedured isclosed in U.S. Pat. 3,056,823, triallyl phosphite was obtained by a transesterification reaction between a triaryl phosphite such as triphenyl phosphite and allyl alcohol. In this process, the reaction mixture was heated to 170° C. and then washed with water to separate the desired triallyl phosphite from the aqueous solution of sodium phenate. The complicated separation procedure made the process unsuitable for large scale production and in addition, a low yield of the desired triallyl phosphite was obtained, i.e., 61%.

In still another procedure described in U.S. Pat. 3,184,496, triaryl phosphite was converted to triethyl phosphite and the last mentioned product was then converted to triallyl phosphite by a transesterification reaction with allyl alcohol. In the example (Example 14) illustrating the preparation of triallyl phosphite, a yield of 89% of the desired product was obtained in a reaction requiring 26 hours for completion. Furthermore, this reference disclosed the use of azeotropic solvents in the transesterification procedures.

Thus, while the prior art disclosed the preparation of triallyl phosphite by a transesterification reaction involving the use of triphenyl phosphite, such a procedure was undesirable since the triallyl phosphite had to be separated from the high boiling phenol by-product. The separation procedure involving the washing with water was not only complicated and unsuitable for large scale production but in addition low yields of the desired product were obtained on exposing the triallyl phosphite to contact with water as this resulted in hydrolysis of the desired triallyl phosphite.

SUMMARY OF THE INVENTION

In accordance with the process of the present invention, a trialkenyl phosphite is obtained, in high yield, high purity and at an extremely rapid reaction rate, by a simple procedure suitable for large scale production involving the transesterification of trimethyl phosphite and an alkenol. The reaction is generally conducted in the presence of an alkaline catalyst and an essential element in the process is that it should be conducted in the presence of a non-azeotropic solvent.

The trialkenyl phosphites are valuable as chemical intermediates as, for example, triallyl phosphite can be oxidized to triallyl phosphate and this last mentioned compound may then be employed in the formation of phosphorus-containing copolymers with commercially available unsaturated monomers. Cotton fabrics may be effectively flameproofed by treatment with brominated partially polymerized triallyl phosphate. Triallyl phosphate may also be brominated to tris-dibromopropyl phosphate, a well-known additive type flame retardant. Further, triallyl phosphite may be isomerized thermally to diallyl allylphosphonate, a compound which can be polymerized into a flame retardant thermosetting type of homopolymer or it may be copolymerized with some commercially available monomers to produce flame retarding copolymers. The diallyl allylphosphonate may also be brominated to the corresponding bis(diboromopropyl)dibromopropylphosphonate, an additive type of flame retardant.

The trialkenyl phosphites of the present invention are also useful as stabilizers for vinyl chloride resins and as oxidation inhibitors for lubricating oils.

DETAILED DESCRIPTION OF THE INVENTION

The present invention provides a new and improved procedure for preparing trialkenyl phosphites by reacting trimethyl phosphite with an alkenol.

Suitable alkenols include, for example, allyl alcohol and methallyl alcohol.

In the reaction, at least 3 moles of the alkenol are required for each mole of the trimethyl phosphite and generally an excess amount of the alkenol is used. Excessive amounts, i.e., 6 or more moles, of the alkenol, are impractical and offer no advantages over the use of a 25 to 50% or higher excess, that is, up to about 100%.

The reaction is a simple one which is suitable for large-scale production and the high yield, high purity and the rapid reaction rate are apparently due to the fact that the reaction is conducted in the presence of a non-azeotropic solvent. The reaction is also generally conducted in the presence of an alkaline catalyst.

Surprisingly, it was found that when triethyl phosphite was used in the transesterification reaction, as illustrated in one of the examples below, high yields could only be obtained after an extended reaction period that is, after the reaction was conducted for a period exceeding 19 hours.

As indicated above, an essential requirement for the successful operation of the present process is that the process should be conducted in the presence of a non-azeotropic solvent and particularly a non-azeotropic solvent boiling between about 120° C. and 160° C. When the reaction is conducted in the presence of an azeotropic solvent, contrary to the teachings of the prior art, i.e. U.S. Pat. 3,184,496, high yields could only be obtained after a long reaction period. Suitable non-azeotropic solvents include, for example, xylene, i.e., m-, o- and p-xylene, ethylbenzene, chlorobenzene, cumene, and the like, and such solvents are used in amounts equal to about the total amounts of the trimethyl phosphite and alkenol reactants. Larger amounts of the non-azeotropic solvent can be employed but offer no practical advantage.

The reaction is generally conducted in the presence of an alkaline catalyst and suitable alkaline catalysts include alkali metal hydroxides, alcoholates and phenolates. Typical alkali metal hydroxides are sodium hydroxide or potassium hydroxide; suitable metallic alcoholates or phenolates include potassium butylate, sodium methylate, potassium methylate, lithium methylate, sodium phenolate, potassium phenolate, sodium allylate, and the like. The catalyst is used in amounts ranging between about 0.001 and 0.20 mole/mole of trimethyl phosphite.

The following examples illustrate the process of the invention but the invention is not to be restricted thereto.

EXAMPLE I

To 37.2 grams of trimethyl phosphite, 62.3 grams allyl alcohol and 80 cc. of xylene, was added 0.5 gram of sodium methylate. The mixture was heated to gentle reflux, distilling off the methyl alcohol formed. Some allyl alcohol and xylene codistilled with the methanol. The rate of progress of this reaction was followed by periodic gas-chromatographic analysis of samples of the reaction mixture. After four hours and 45 minutes of heating, gas-chromatographic analysis showed that the conversion to triallyl phosphite is 97.1% completed. The reaction mixture, upon fractionation, gave a yield of triallyl phosphite equivalent to 92% based on the original trimethyl phosphite used.

EXAMPLE II

The procedure of Example I was followed except that 149 grams of trimethyl phosphite, 209 grams of allyl alcohol, 320 cc. of xylene and 2 grams of sodium methylate were used. The mixture was heated to distill off a mixture of methanol, allyl alcohol and xylene. The vapor temperature in the distillation was maintained at above 70° most of the time. After four hours and 32 minutes of heating, gas-chromatographic analysis showed that the conversion to triallyl phosphite was 91.6% completed; and after five hours and 39 minutes the conversion was 97.4% completed. Fractional distillation of this mixture gave a yield of 221.6 grams of triallyl phosphite, which is equivalent to 91.5% based on the trimethyl phosphite used.

EXAMPLE III

To illustrate the special suitability of trimethyl phosphite in the preparation of the desired trialkenyl phosphites in high yield and in a fairly short reaction time, triethyl phosphite was used in place of trimethyl phosphite.

Following the procedure described in Example I except for the use of 0.3 mol of triethyl phosphite (49.8 grams) and the use of 52.2 grams of allyl alcohol, 80 cc. of xylene and 0.5 gram sodium methylate, the mixture was heated to distill off the ethyl alcohol along with some allyl alcohol and xylene. The progress of this transesterification reaction was also followed by periodic gas-chromatographic analysis of the reaction mixture. After nineteen hours, only 89.4% of the triallyl phosphite was formed; and after 23 hours the formation of triallyl phosphite was increased to 93.5%. The quantity of triallyl phosphite formed did not go above the 93.5% value even after a total of twenty-nine hours. The product was fractionated and the yield of triallyl phosphite accounted for in different fractions was equivalent to a total of 74.5% of theory.

EXAMPLE IV

This example illustrates the fact that the transesterification reaction requires the use of a non-azeotrope. Thus, the procedure described in Example I supra was followed using the identical quantity of reactants, except for the replacement of xylene by 80 cc. of toluene. It is known from the literature that toluene forms an azeotrope with methanol which boils at 63.8° C. and contains 69% methanol. Since the process used in the transesterification reaction involved the removal of the methanol formed and thus prevented it from the back transesterification, azeotropic solvents would be expected to increase the rate of the transesterification reaction.

The rate of formation in this example is followed by periodic gas-chromatographic analysis. After thirteen hours and 45 minutes, only 87.5% of triallyl phosphite was formed. After nineteen and a half hours, 98.5% of triallyl phosphite was formed. The mixture was fractionated and the yield of triallyl phosphite from the various fractions represented a yield of 86.5%.

EXAMPLE V

Following the procedure described in Example I supra except for the use of a large excess of allyl alcohol i.e., about 10 times the excess (and in the absence of a non-azeotropic solvent) to codistill off the methanol formed, the reaction took approximately twenty-nine hours for the formation of 95% triallyl phosphite. Upon fractionating the product, there was obtained a yield of 85% of triallyl phosphite.

EXAMPLE VI

Following the procedure described in Example I supra except for the use of a 180% excess of allyl alcohol (and also in the absence of a non-azeotropic solvent), the methanol was codistilled with the allyl alcohol. More allyl alcohol was added to maintain the large excess and to help distill off the methanol formed. The total allyl alcohol used was equivalent to approximately 400% excess over that of the theory. It required fifteen hours for the formation of 97% of triallyl phosphite. Upon fractionation, the yield of triallyl phosphite was 82.4%. This example illustrates the criticality of the use of the non-azeotropic solvent in order to insure high yield in a fairly short reaction period.

EXAMPLE VII

Following the procedure described in Example I supra except for the use of ethylbenzene in place of xylene as the non-azeotropic solvent, the desired triallyl phosphite product was obtained in a comparable yield and period of time, as in Example I.

EXAMPLE VIII

Following the procedure described in Example I supra except for the replacement of allyl alcohol by methallyl alcohol, trimethallyl phosphite was obtained in a comparable yield and period of time, as in Example I.

The examples set out above clearly indicate that the rate of reaction in the transesterification reaction between the selected trialkyl phosphite and alkenol, in the presence of a non-azeotropic solvent, was unexpectedly rapid and the yield of the desired product was high.

I claim:

1. A process for the preparation of a trialkenyl phosphite which comprises:
   (a) admixing an alkenol selected from the group consisting of allyl alcohol and methallyl alcohol with trimethyl phosphite in a non-azeotropic solvent selected from the group consisting of xylene, ethylbenzene, chlorobenzene and cumene, said alkenol being added in at least a 3:1 molar ratio to said trimethyl phosphite and said solvent being present in an amount at least equal to the total amount of trimethyl phosphite and alkenol used;
   (b) heating the mixture of step (a) at the reflux temperature; and
   (c) separating the diallyl phosphonate from the reaction product.

2. The process of claim 1 wherein the non-azeotropic solvent additionally contains from about 0.001 to about 0.20 mole of an alkaline catalyst per mole of trimethyl phosphite, said catalyst being selected from the group consisting of alkali metal hydroxides, alkali metal alkoxide, alkali metal alcoholates and alkali metal phenolates.

3. A process according to claim 2 wherein the reaction is conducted in the presence of xylene.

References Cited

UNITED STATES PATENTS

| | | | |
|---|---|---|---|
| 2,852,551 | 9/1958 | Hechenbleikner | 260—982 |
| 3,184,496 | 5/1965 | Baranauckas et al. | 260—982 X |
| 3,215,720 | 11/1965 | Atwood et al. | 260—982 X |
| 3,268,630 | 8/1966 | Spivack | 260—982 X |

CHARLES B. PARKER, Primary Examiner

R. L. RAYMOND, Assistant Examiner.

U.S. Cl. X.R.

252—8.1; 260—969, 985, 986